United States Patent [19]

Kliman

[11] Patent Number: 4,918,831
[45] Date of Patent: Apr. 24, 1990

[54] METHOD OF FABRICATING COMPOSITE ROTOR LAMINATIONS FOR USE IN RELUCTANCE, HOMOPOLAR AND PERMANENT MAGNET MACHINES

[75] Inventor: Gerald B. Kliman, Schenectady, N.Y.

[73] Assignee: General Electric Company, Schenectady, N.Y.

[21] Appl. No.: 424,438

[22] Filed: Oct. 20, 1989

Related U.S. Application Data

[62] Division of Ser. No. 138,404, Dec. 28, 1987.

[51] Int. Cl.⁵ .............................................. H02K 15/02
[52] U.S. Cl. .................................... 29/598; 29/467; 29/732; 228/49.1; 228/185; 310/42; 310/156
[58] Field of Search ..................... 29/598, 467, 732; 310/216–218, 42, 156, 261; 228/179, 185, 49.1

[56] References Cited

U.S. PATENT DOCUMENTS

| | | |
|---|---|---|
| 4,472,651 | 9/1984 | Jones .................................. 310/156 |
| 4,597,172 | 7/1986 | Bourgeois ....................... 29/596 X |
| 4,729,160 | 3/1988 | Brown ................................... 29/598 |

Primary Examiner—Carl E. Hall
Attorney, Agent, or Firm—Jill M. Breedlove; James C. Davis Jr.; Marvin Snyder

[57] ABSTRACT

In a homopolar, switched reluctance, or interior permanent magnet motor, formed rotor laminations are employed to reduce eddy current losses in the pole faces and body of the rotor. The homopolar and switched reluctance motor lamination is comprised of a magnetic portion having a plurality of pole pieces extending generally radially outward from the core portion and forming a plurality of interpole spaces. Non-magnetic, high resistance segments are bonded between the pole pieces to minimize windage losses and increase strength. The non-magnetic segments may be thinner in the axial direction than the magnetic portion to prevent contact between stack laminations. Additionally, a gap may be left between the interior core portion and the non-magnetic segment to facilitate use of automated welding techniques. In the interior permanent magnet motor lamination, the non-magnetic segments perform the function of circumferential bridges, with or without restraining ligaments, to increase the rotor strength and speed capability and increase specific torque.

5 Claims, 5 Drawing Sheets

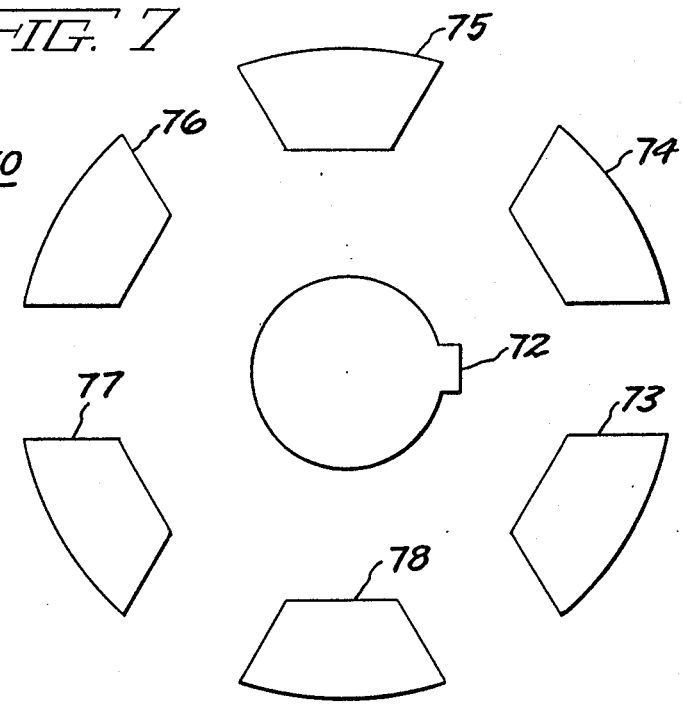

METHOD OF FABRICATING COMPOSITE ROTOR LAMINATIONS FOR USE IN RELUCTANCE, HOMOPOLAR AND PERMANENT MAGNET MACHINES

This application is a division of application Ser. No. 138,404, filed 12/28/87.

BACKGROUND OF THE INVENTION

This invention relates to a laminated magnetic rotor for a motor and a method of fabricating the rotor laminations, and more specifically to the construction of composite disk laminations for use in reluctance, homopolar or interior permanent magnet rotors.

Reluctance, homopolar and interior permanent magnet machines share the property of requiring magnetic saliency. In the reluctance and homopolar machines this always implies geometric saliency. The result is high windage losses, especially since the machines are favored for high speed. To achieve high strength, solid rotors are often employed; however, this leads to large pole face losses due to slot ripple and, for the switched reluctance motor, flux exclusion and intolerable rotor core losses, resulting in loss of efficiency and local heating. The salient poles also incur considerable aerodynamic or windage losses. Thus, it has become desirable in reluctance, homopolar and interior permanent magnetic machines to construct the rotor of a stack of composite disk laminations.

An example of a prior art homopolar machine is seen in high speed flywheel energy storage systems, such as are useful in generating mobile electrical power for vehicular transportation. These energy storage systems have stringent limitations on volume and weight of the power generating system which necessitate use of small, lightweight alternators with high power output capabilities. This in turn requires that the alternator operate at high speeds. Conventional wound rotor alternators, however have been limited in operating speed since, at high angular velocities, typically above about 26,000 rpm, mechanical stresses in the rotor windings become excessive. Solid rotor machines, therefore, have heretofore been necessary since, at the high angular velocity of operation, only a solid rotor could withstand the high mechanical stresses thereby incurred. Typical of such solid rotor machines has been the homopolar inductor alternator. In such machines, the rotor has carried no windings and has basically been comprised only of magnetic material, thus facilitating rotor operating speeds in excess of 90,000 rpm for small machines.

In FIG. 1, a conventional prior art rotor 10 for an eight-pole homopolar inductor alternator is illustrated. This rotor, comprised of solid magnetic steel, has been employable with a conventional wound stator (not shown) of the type described by E. Richter in the Conference Proceedings of the 1971 Intersociety Energy Conversion Engineering Conference, Boston, Mass., pages 132-139, Aug. 3-5, 1971. The rotor is formed with two general regions 11 and 12, each region including half the total number of rotor poles. The salient poles in region 11 are circumferentially offset from the salient poles in region 12 by an angle $\theta$ which is defined as 360 degrees/N, N being the total number of poles on the rotor. For an eight-pole rotor as shown in FIG. 1, angle $\theta$ equals 45 degrees.

The only magnetic material required for proper rotor operation is that which provides flux paths between corresponding pole faces, such as faces 13 and 14 of the rotor shown in FIG. 1. A typical magnetic flux path in this material is illustrated in FIG. 2A as it would appear if the rotor, shown in FIG. 1, is viewed longitudinally from the left end. Any more magnetic material other than similar segments typified by that shown in FIG. 2A is extraneous to the magnetic circuit for the flux path furnished by the material of FIG. 2A, and can only increase the leakage flux. FIG. 2B illustrates rotor magnetic flux paths when the rotor is viewed from the side.

During operation of the homopolar alternator containing rotor 10, magnetic flux which enters a pole face in one region exits the opposite complementary pole face in the other region. Specifically, magnetic flux entering pole face 13 may exit at pole face 14. Minor variations in the flux passing through pole faces 13 and 14 due to relative motion of the stator induce eddy current flow in the faces, causing electrical loss and attendant heating of the pole faces. Moreover, since the entire rotor is magnetic, there exists a large amount of magnetic flux that does not pass through the air gaps located between the stator and the pole faces and on the rotor. This flux tends to saturate the rotor arm without contributing to the alternator output. Efficiency of the machine is thereby reduced.

One method of alleviating the aforementioned problems arising due to eddy currents in the rotor of FIG. 1 involves use of planar laminations in the manner illustrated in FIG. 3. This construction allows much of the rotor intermediate the regions containing the poles to be fabricated of non-magnetic material, so that leakage flux can be reduced. Specifically, a solid ring 25 of magnetic material abuts, and is situated between, first and second stacks 26 and 27, respectively, of planar laminations 23 and 24, respectively, of magnetic steel in order to form a low reluctance path between radially-consecutive poles formed by the laminations and separated axially. A non-magnetic spacer 28 encircles ring 25 and helps maintain lamination stacks 26 and 27 packed tightly together and oriented normal to longitudinal axis 30 of rotor shaft 31. The stacks of laminations are urged toward each other axially by non-magnetic end clamps 35 and 33 in a manner well known in the art. This configuration, by employing non-magnetic spacers to help keep the radially-outer portions of lamination stacks 26 and 27 uniformly spaced apart from each other, avoids the necessity of having to add iron around the magnetic ring 25, thereby holding the amount of leakage flux to a low value.

While welding of the laminations to a solid part is not critical in the rotor shown in FIG. 3, another form of magnetic machine which requires laminations has properties in which such welding is critical. In the latter form of machine, such as typified by that shown and described in Miller et al. U.S. Pat. No. 4,464,596, issued Aug. 7, 1984 and assigned to the instant assignee, solid, axially-extending non-magnetic inserts are welded to laminated pole pieces. A limitation on operating such rotor at very high speed has been the insufficient strength of the bond between dissimilar materials in the region of the inductor rotor which is highly stressed by centrifugal force. This bond typically involves welding or brazing of the stacks of laminations to solid members. Another factor that has limited use of rotors requiring bonds between dissimilar materials has been the difficulty in achieving adequate penetration of the weld between such materials, and especially the need for extensive skilled manual direction and setup to make the weld. For example, homopolar rotors comprised of axially-stacked laminations of magnetic material with solid, non-magnetic interpole sections welded axially to the stacked laminations have been fabricated, but such rotors have not been commercialized because of their high cost of construction resulting from the inability to automate their fabrication. It would be highly desirable to overcome these limitations of speed and high cost in the rotor of homopolar machines.

Turning now to a brief discussion of reluctance magnetic machines, switched reluctance motors conventionally have poles or teeth on both the stator and the rotor (i.e., they are doubly salient). There are phase windings on the stator but no windings on the rotor. Each pair of diametrically opposite stator poles is connected in series to form one phase of the switched reluctance motor. Torque is produced by switching current on in each phase winding in a predetermined sequence that is synchronized with the angular position of the rotor, so that a magnetic force of attraction results between the rotor and stator poles that are approaching each other. The current is switched off in each phase at the commutation point before the rotor poles nearest the stator poles of that phase rotate past the aligned position; otherwise, the magnetic force of attraction will produce a negative or braking torque.

The switched reluctance magnetic machine rotor has many of the same problems as the homopolar rotor. Therefore, it would be highly desirable to overcome the limitations of prior art reluctance rotors in speed and in the high cost of fabricating such rotors.

With reference to interior permanent magnet machines, rotors of this type of machine have similar problems to overcome. For example, to overcome eddy currents in interior permanent magnet machines, a rotor has been comprised of a stack of disk laminations. An example of such a prior art rotor is shown in Jones U.S. Pat. No. 4,486,679, issued Dec. 4, 1984 and assigned to the instant assignee. The rotor of the Jones patent is comprised of a stack of disk laminations, each of the laminations having a plurality of pole piece sections connected to one another by circumferential bridges situated at the disk periphery, with the pole piece sections and interior core portion defining the radial thickness of magnet slots. Radial ligaments situated on each disk connect the interior portion of the disk lamination to the circumferential bridges. In fabricating the rotor, the disk laminations are stacked so that the magnet slots extend through the stack in an axial direction. The magnets are placed in the magnet slots and the bridges are pressed inwardly, plastically deforming the bridges and ligaments, creating a predetermined hoop stress which holds the magnets in their respective slots when the pressing force is removed. However, the strength, and hence maximum rotor speed, is determined by the stress in the bridges. These bridges must be kept as thin as possible in order to minimize the amount of magnetic flux required to saturate them to assure proper operation of the motor. Since the bridges are of the same magnetic material as the rest of the rotor, their tensile strength is low, limiting the maximum operating speed of the rotor. Therefore, it would be highly desirable to increase the strength of the bridges and reduce their magnetic effect and thus increase both the speed capability of the rotor and the specific torque of the motor.

SUMMARY OF THE INVENTION

It is therefore an object of the present invention to overcome the problems of the prior art disk lamination rotors by providing a high-strength disk lamination which reduces both rotor electrical losses and windage losses to achieve higher efficiency.

It is another object of the present invention to provide a homopolar or switched reluctance disk lamination of high strength for the rotor of a magnetic machine which facilitates rotor assembly with automated welding techniques.

It is yet another object of the present invention to provide a rotor for a permanent magnet machine with improved strength for use in high speed, high performance machines.

It is a further object of the present invention to provide a composite disk lamination for a rotor of a magnetic machine which facilitates use of high precision automated welding assembly.

Another object of the present invention is to provide a technique for achieving full penetration welds in fabricating composite rotor laminations for homopolar, switched reluctance, or interior permanent magnet machines in which the processing is totally planar and fully compatible with state-of-the-art automated laser or electron beam computer-directed welding systems.

In general, and in accordance with the invention, the rotor of a homopolar motor or of a switched reluctance motor is comprised of a stack of disk laminations. Each disk lamination comprises a magnetic portion with an interior core portion connected to a plurality of radially outwardly extending pole pieces, forming a plurality of interpole spaces between the pole pieces. A trapezoidal-shaped non-magnetic segment is inserted in each interpole space such that the edges of the non-magnetic segment abut the edges of the pole pieces. The non-magnetic segments are welded to the pole pieces by electron beam or laser beam techniques. The edges of the pole pieces are generally straight lines to decrease the welding complexity and increase its accuracy. In one embodiment of the invention, a gap is left between the outer edge of the interior core portion and the inner edge of the non-magnetic segment to further decrease complexity of the welding process. The non-magnetic segment may be thinner than the magnetic portion to aid in preventing the welding bead from extending above the plane of the disk.

In another aspect of the present invention, a rotor for a permanent magnet machine is comprised of a stack of disk laminations. Each lamination is comprised of an interior core portion having a magnet slot aligned so that the stack of laminations defines a passageway through the stack in an axial direction. A plurality of circumferential pole pieces are situated at the periphery of each disk and separated from the interior core portion by the magnet slot. A plurality of circumferential high strength non-magnetic segments connect the circumferential pole pieces to each other and to the interior core portion by welding. The non-magnetic segments may be thinner, in the axial direction, than the pole pieces, to minimize contact between laminations and to keep the welding bead from extending above the plane of the disk.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 7 illustrates a jig used in aligning the centerlines of the non-magnetic segments and magnetic portions of a composite rotor lamination for a homopolar or switched reluctance machine;

DETAILED DESCRIPTION OF THE PREFERRED EMBODIMENT

In general, a method for constructing a disk lamination for a rotor of a magnetic machine is shown and described. To best illustrate the utility of the invention, it is described in conjunction with rotors for three different types of machines capable of different rotating speeds and torques. While the present invention is described hereinafter with reference to rotors for particular homopolar, switched reluctance, and interior permanent magnet machines, it is contemplated that the apparatus and methods in accordance with the present invention may be used with numerous configurations of the above mentioned types of rotors.

Figure 1:
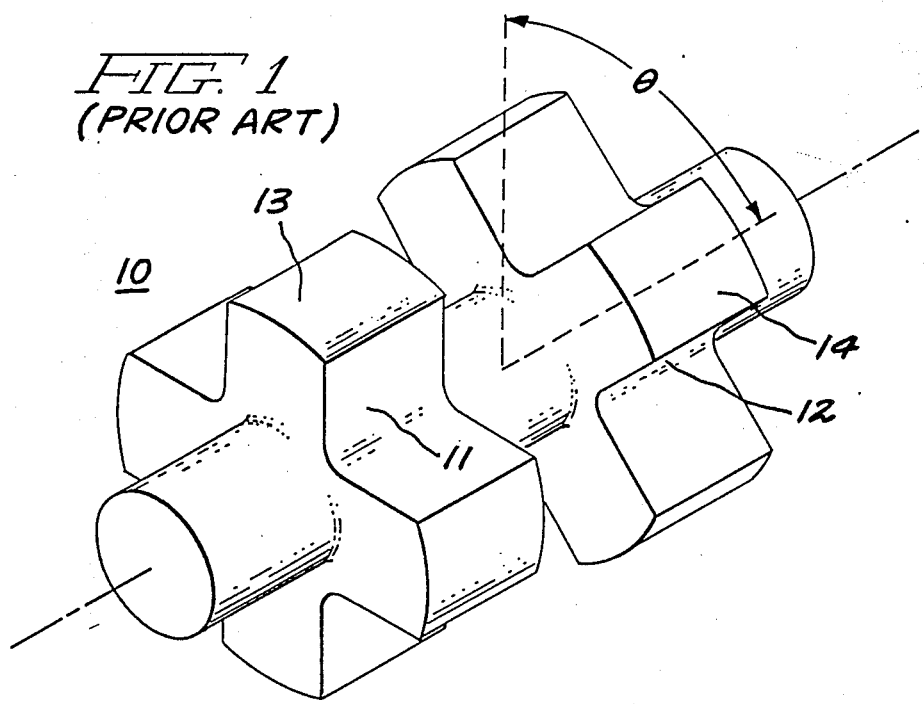
FIG. 1 illustrates a homopolar inductor alternator rotor fabricated of solid magnetic material as known in the prior art.
Figure 2A:
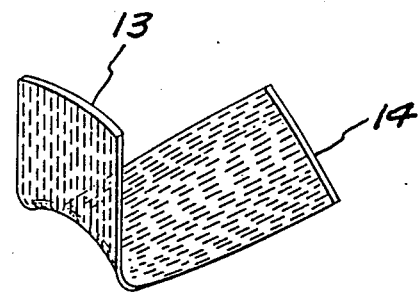
FIGS. 2A and 2B are a fragmentary end view and side view, respectively, of the rotor configuration shown in FIG. 1, illustrating magnetic flux paths extending, through a thin segment of the magnetic material, from a pole face in one region of the rotor to a pole face in the other region of the rotor.
Figure 2B:
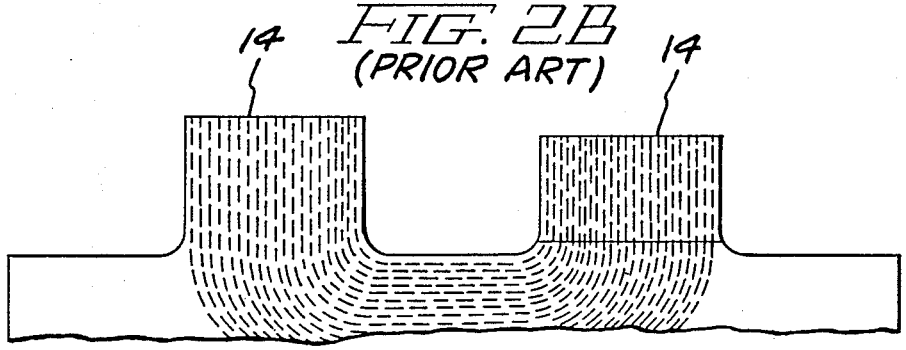
Figure 3:
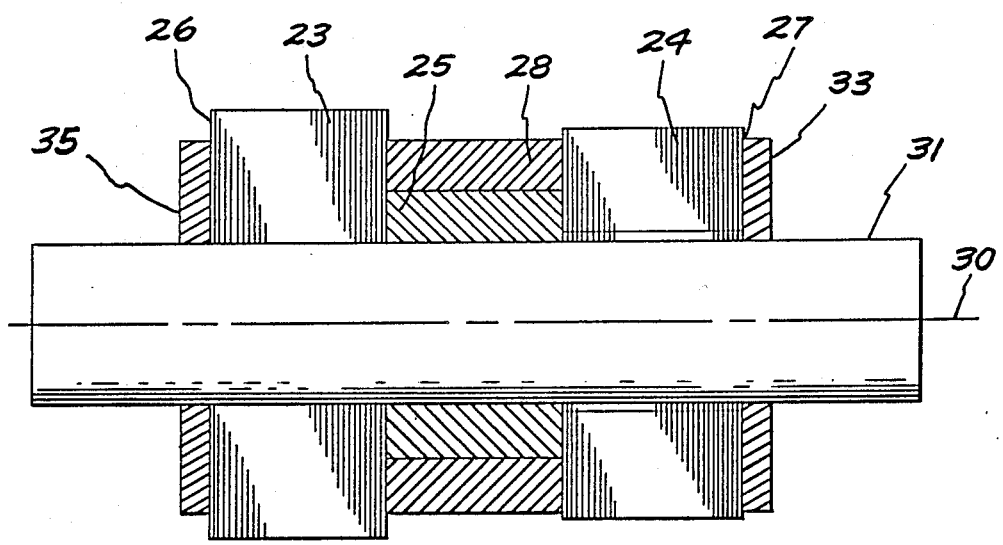
FIG. 3 is a side view of a laminated rotor of overall configuration such as shown in FIG. 1, but wherein planar laminations make up the poles.
Figure 4:
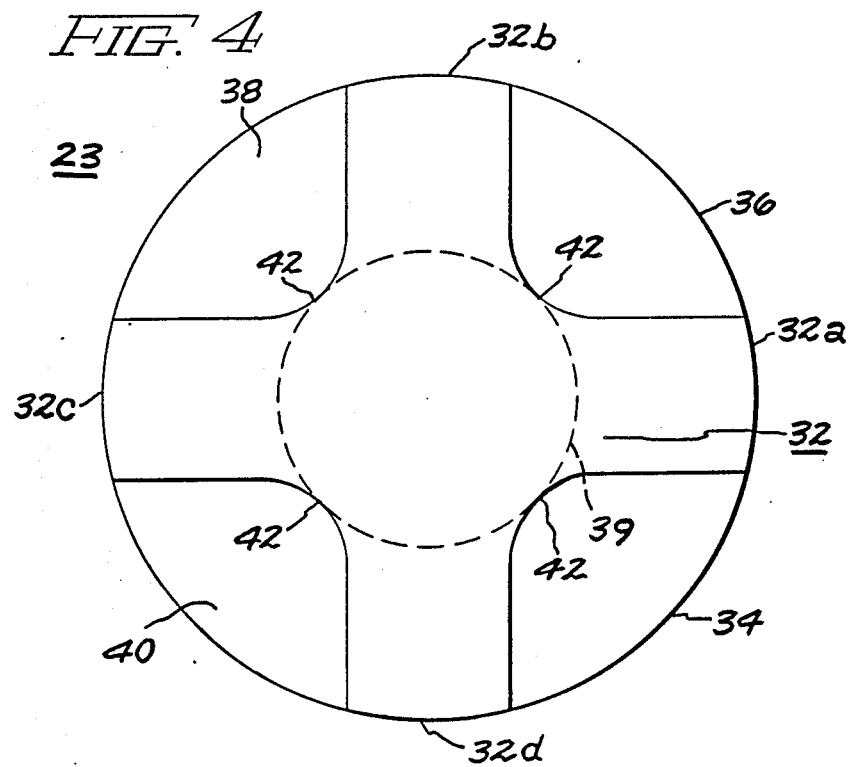
FIG. 4 is an end view of a composite planar lamination according to the present invention useful in constructing either the rotor of a homopolar machine, such as the rotor of FIG. 3 or, equally well, the rotor for a switched reluctance machine.

In FIG. 4, a rotor lamination 23 for a homopolar rotor from the lamination stack 26 of FIG. 3 is shown. Although an eight-pole rotor is illustrated, it is understood that rotors having a different number of poles may be constructed using the method herein described. The rotor lamination 23, being for an eight-pole rotor, is comprised of magnetic portion 32, having a uniform thickness (approximately 20 mils or less), formed, for example, by stamping laminations from a magnetic steel sheet, and includes segments of non-magnetic steel 34, 36, 38 and 40 of the same thickness as the magnetic portion 32.

The magnetic portion 32 includes an interior core portion 39 having a plurality of pole pieces 32a, 32b, 32c and 32d extending generally radially outward from the core portion and forming a plurality of interpole spaces. Segments 34, 36, 38 and 40 having a uniform thickness are inserted between adjacent pairs, respectively, of the pole pieces 32a, 32b, 32c and 32d of magnetic portion 32. The magnetic portion 32 may be comprised of steel, magnetic material such as Permendur cobalt-iron alloy, or other magnetic alloys. The segments 34, 36, 38 and 40 may be comprised of non-magnetic material, such as stainless steel or Inconel alloys, having a high electrical resistivity. Electrical losses in the non-magnetic portions of the laminations are relatively small compared to those in the magnetic sections due to the high resistivity and narrow thickness of the non-magnetic sections of the laminations, as well as the low flux density therein which is only that of the leakage fields. The narrow thickness of the laminations (20 mils or less) facilitates full penetration welds between the magnetic portion 32 and non-magnetic segments 34, 36, 38 and 40 with available electron beam or laser welding systems. However, an accurate fit is required between non-magnetic segments 34, 36, 38 and 40 and adjacent pairs, respectively, of pole pieces 32a, 32b, 32c and 32d, for effecting a proper weld. The avoidance of mechanical saliency considerably reduces the windage loss.

Another benefit of the composite lamination is the reduction of stresses at the root (or minimum diameter point 42) of the mechanical saliency. In practice, the minimum diameter point 42 is at high mechanical stress. The non-magnetic segments 34, 36, 38 and 40 more evenly distribute the stresses, allowing operation of the rotor at higher speeds or with lower tensile strength magnetic material. Still another benefit of the composite lamination is the added inertia of the stainless steel, which results in storing additional energy for those applications in which it is useful.

Figure 5:
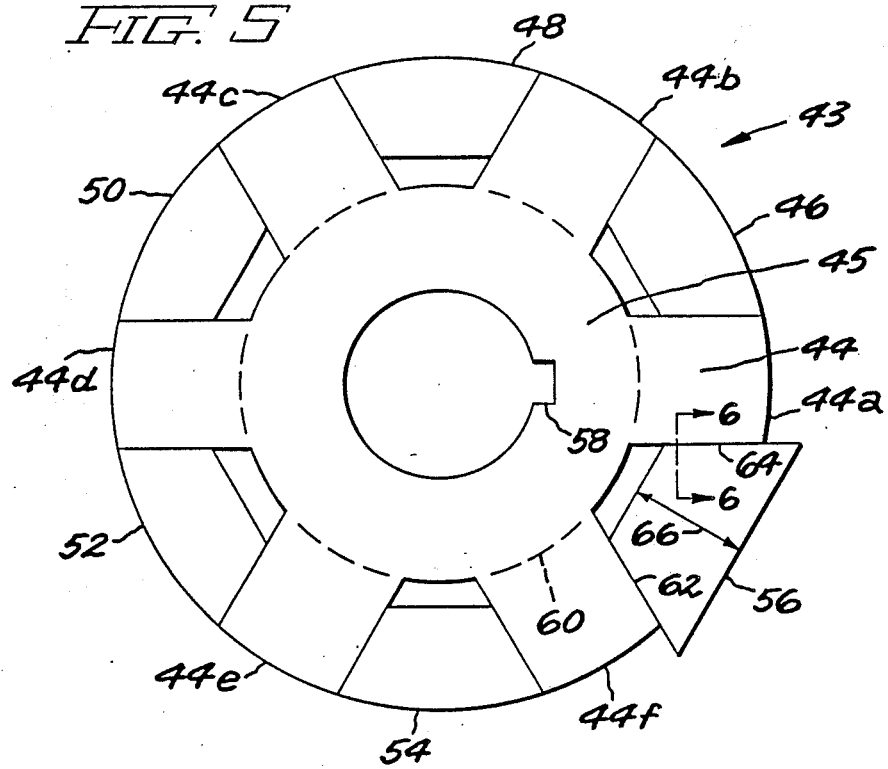
FIG. 5 is an end view of a composite planar lamination for a switched reluctance rotor.

FIG. 5 illustrates the versatility of another embodiment of the present invention, showing, as an example, a composite lamination 43 for the rotor of a switched reluctance motor. In this motor, lamination 43 has a plurality of pole pieces 44a, 44b, 44c, 44d, 44e and 44f and includes a plurality of non-magnetic wedges, inserts, or segments 46, 48, 50, 52, 54 and 56, each of which fits a separate interpole space, respectively, in magnetic portion 44. As shown, the magnetic portion 44 of disk lamination 43 comprises an interior core portion 45 from which the pole pieces extend outward in a generally radial direction. The interior core circumference is approximated by dotted line 60.

A locator, such as keyway 58 in magnetic portion 44, is often employed for aligning the rotor lamination on the rotor shaft and used for alignment in constructing the lamination. Other ways of locating laminations on the shaft are well known in the art, such as shrinkfitted laminations or use of slightly non-circular shaft cross sections and matching central openings in the laminations provided with small features for alignment. In the illustrated embodiment, the necessity of an accurate fit between each pair of adjacent magnetic pole pieces 44a, 44b, 44c, 44d, 44e and 44f and the non-magnetic segments 46, 48, 50, 52, 54 and 56 respectively situated therebetween is eliminated by not requiring a weld at the core circumference 60. Only the angle of a non-magnetic segment need be precise so that the segment accurately fits into an interpole space of magnetic portion 44 simply by sliding into contact. For example, referring to non-magnetic segment 56, an accurate fit between segment 56 and pole pieces 44a and 44f need only exist along weld lines 62 and 64. The benefits of low windage loss and high strength are achieved with these composite laminations. Furthermore, need for a complex path to be followed by a welding robot in robotic index welding is eliminated by use of straight line welds as illustrated by lines 62 and 64. These welds can be effected with conventional indexing techniques well known to those having skill in welding automation techniques.

In constructing the composite rotor 43, the radial width of the segment wedge (shown as line 66) need not be determined accurately. Each segment is inserted into a respective interpole space of magnetic portion 44. The welding of each segment takes place with the radial widths of each segment being inconsequential. After each segment is bonded between the pole pieces of magnetic portion 44, as along the weld lines 62 and 64 of segment 56, for example, a disk having a precise diameter can be structured by simply cutting the circumference of the composite lamination by any one of a number of well-known techniques, such as laser cutting or turning with a tool. The result is a perfectly circular disk lamination with segments 46 through 56 respectively situated between adjacent pairs of the pole pieces of magnetic portion 44. As is evident, to accomplish sufficient fit between non-magnetic segments 46, 48, 50, 52, 54 and 56 and adjacent pairs of pole pieces 44a, 44b, 44c, 44d, 44e and 44f, respectively, the interior radial edges of the pole pieces must each be a generally straight line, but need not be precise. Similarly, the radial edges of the non-magnetic segments which occur along the weld lines must also be generally straight lines and of comparable tolerance to the magnetic portion 44 radial edges. Only the angle of the radial edges of the non-magnetic segments and pole pieces must be precise.

Figure 6:
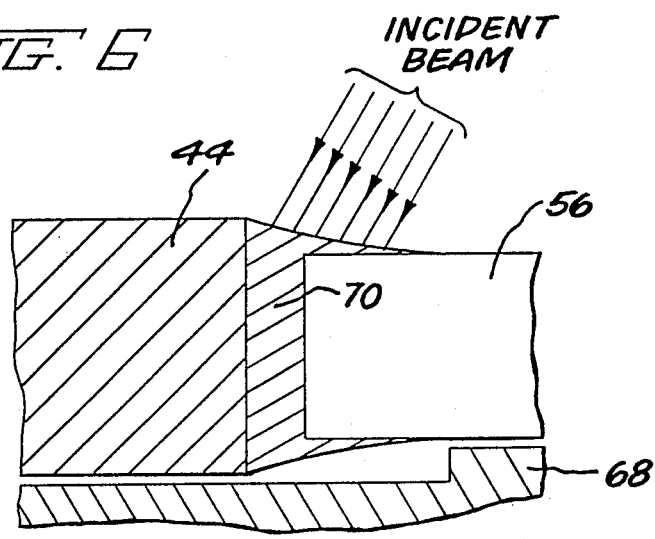
FIG. 6 is a view taken along line 6—6 of FIG. 5, illustrating a table used in a jig useful in welding a thinner non-magnetic segment to the magnetic portion of the rotor lamination.

FIG. 6 illustrates a further refinement for welding non-magnetic segments 46, 48, 50, 52, 54 and 56 to magnetic portion 44. In this embodiment, the non-magnetic segments 46, 48, 50, 52, 54 and 56 are made thinner in the axial direction than the base magnetic portion 44. The lamination suffers no loss of strength in so doing, since the non-magnetic segment material is typically stronger than the magnetic base material. No significant increase in windage loss results since the gaps caused by the difference in thickness between the magnetic material and the non-magnetic material are small compared to the boundary layers. FIG. 6 shows how one non-magnetic segment 56 is set on a table 68 to approximately center it with respect to magnetic portion 44, and is a view taken along line 6—6 of FIG. 5. A small gap of approximately one mil may be left in the butt joint region illustrated as area 70. The butt joint region occurs along the weld lines as shown in FIG. 5.

Table 68, shown in FIG. 6, may be comprised of a copper base plate or other suitable material for electron beam or laser welding. In welding the non-magnetic segments to the magnetic material, the non-magnetic segments are inserted between the pole pieces, and the incident electron or laser beam irradiates the gap 70 between magnetic portion 44 and insert 56. Irradiation need only be directed toward one face of the lamination to achieve full penetration of the weld, due to the small thickness of the lamination. Several benefits result from this method of construction. First, the lower level of the non-magnetic segment 56 surface facing toward the radiation source (not shown) causes the liquified metal formed during welding to be pulled down by surface tension instead of being pulled up into a bead, thus assuring no bead formation, or even a negative bead. The small gap 70 enhances this effect by providing space for the liquid material to flow away from the surface, thus virtually eliminating the possibility of contact between stacked laminations. The resulting clearance between the laminations electrically insulates the non-magnetic inserts, thereby minimizing electrical losses. An added benefit is that the thinner non-magnetic material presents a higher resistance to fringing field-induced currents, further reducing electrical losses.

In practicing the invention, applicant has discovered that using $3\frac{1}{2}\%$ unannealed silicon steel for the magnetic material and Inconel alloy for the non-magnetic segments provided the best match of thermal properties between the two materials. Since Inconel alloy is about 2.5 times the resistivity of silicon steel, the thinner non-magnetic segment material resistivity is effectively 5 times that of the silicon steel so that induced current losses are virtually eliminated compared to the main pole induced current losses. Although silicon steel and Inconel alloy have been used in practicing the invention, various alternative combinations can be used in fabricating the rotor composite lamination.

FIG. 7 shows a jig 70 for use in automated welding of the non-magnetic segments to the magnetic material. The jig 70 includes a plurality of tables 73–78, each table corresponding, respectively, to the position and geometrical shape, in plan view, of a non-magnetic segment. A locator 72, slightly raised on jig 70, aligns the pole pieces of the magnetic material with the tables such that the magnetic material is situated in the gaps between the tables. The tables are slightly raised, as shown in FIG. 6, to allow the center lines in the radial direction for the magnetic material and the non-magnetic segments to approximately align in a common radial plane.

In factory automation, the non-magnetic segments are robotically placed in position and guided by tables 73–78 until the radial edges of the segments contact the radial edges of the pole pieces of magnetic material while being held in place. The welding robot then welds the radial edges of the non-magnetic segments to the pole piece edges of magnetic material. Since the welds are straight line welds, great precision is obtained along with a reduction in manual handling and an increase in speed of welding.

Figure 8A:
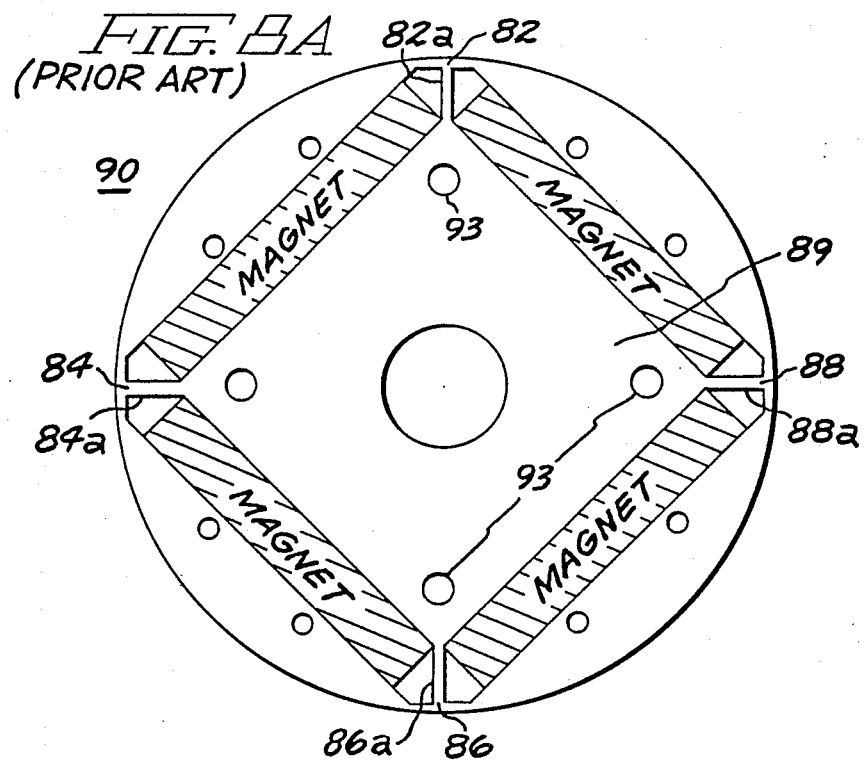
FIG. 8A is a plan view of an interior permanent magnet disk lamination having circumferential bridges and radial restraining ligaments made of the same material as the core portion of the rotor as known in the prior art.
Figure 8B:
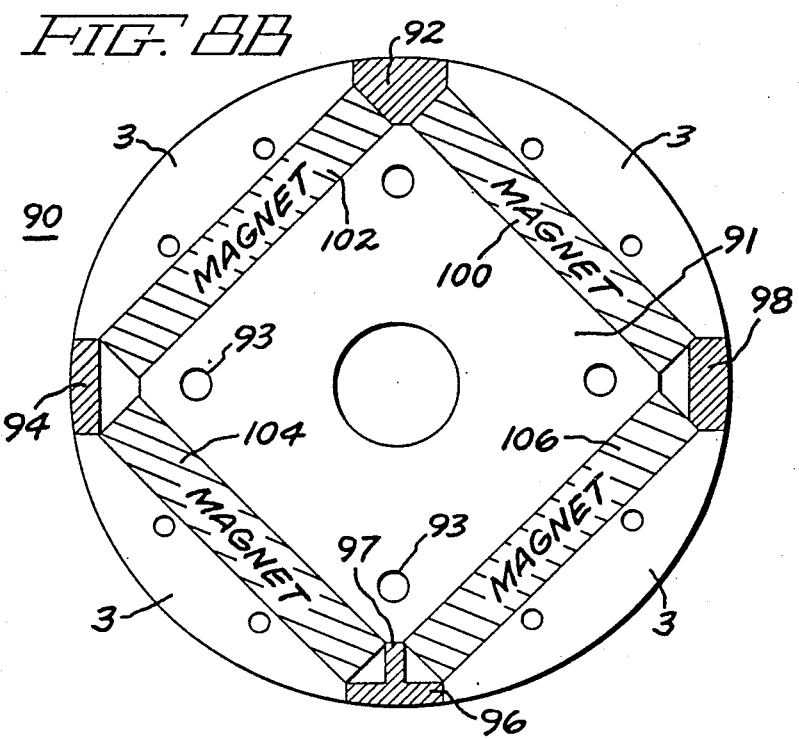
FIG. 8B is a plan view of a disk lamination of the present invention is useful in constructing the rotor of a permanent magnet machine, such as that of FIG. 8A with different examples of non-magnetic inserts replacing the circumferential bridges and restraining ligaments.

FIGS. 8A and 8B illustrate the technique of manufacturing the disk laminations which may be employed in an interior permanent magnet rotor as disclosed in the aforementioned Jones U.S. Pat. No. 4,486,679. Specifically, FIG. 8A shows the conventional rotor structure disclosed by Jones. The strength, and hence maximum speed, of the rotor is determined by the stress in the circumferential bridges 82, 84, 86 and 88. The bridges must be kept as thin as possible in order to minimize the amount of magnet that must be devoted to saturating them to assure proper operation of the motor. The circumferential bridges 82, 84, 86 and 88 are connected to the core portion 89 of the disk by radial restraining ligaments 82a, 84a, 86a and 88a, respectively. Since the circumferential bridges 82, 84, 86 and 88 and the restraining ligaments 82a, 84a, 86a and 88a are of the same magnetic material as the rest of the rotor, their tensile strength is low compared to that of Inconel alloy or stainless steel. Even though fabrication of such a rotor is relatively simple, its strength and top speed are severely limited by these bridges and ligaments. Holes 93 are used to admit through-bolts or molten aluminum for holding the rotor stack together when assembled.

FIG. 8B shows four types of non-magnetic segments or inserts 92, 94, 96 and 98 that may b used in the inner magnetic region of the lamination of FIG. 8A instead of the circumferential bridges and restraining ligaments, so as to increase the strength and speed capability of the rotor 90. Since the tensile strength of the materials used in the non-magnetic inserts is high, there is considerable flexibility in the geometry of the inserts, as illustrated by the inserts 92, 94, 96 and 98. It must be noted that none of these inserts is welded to magnets 100, 102, 104 and 106 since the magnets are inserted axially into their corresponding slots in the rotor after the rotor stack of composite laminations has been assembled.

Insert 92 is a "full" insert and hence is welded to interior core portion 91 and to the pole sections 3. Since the material of the full insert is stronger than the magnetic material, the strength of the lamination is increased, thus increasing the maximum speed capability of the rotor.

Insert 94 is a "partial" insert and is welded only to the edges of the pole section 3. The construction of insert 94 requires only two straight line welds along the edges of the pole pieces 3. Thus, insert 94 requires less robotic activity than "full" insert 92 and provides for a shrink fit of the outer ring over the magnets. Insert 98 is another, slightly larger "partial" insert having its edges welded to pole section 3. Insert 98 provides greater strength than insert 94, due to its greater radial thickness than insert 94.

Insert 96 is geometrically and functionally similar to the bridges and ligaments shown in FIG. 8A. This insert is welded between the pole sections 3 and includes a restraining ligament 97 which is welded to the interior core portion 91. This type of insert provides greater convenience in assembly than insert 94. As will be appreciated by those skilled in the art, the geometric configuration of the insert can be designed in accordance with the strength and maximum speed capability required of the rotor. This flexibility in the geometry of the inserts allows the speed and strength capability of the rotor to be maximized, depending upon the function of the rotor. For example, a low speed rotor may use insert 94, while a very high speed rotor may use insert 92 (or 98). It will also be appreciated that rotor balance requires that all the inserts in any given rotor be of the same type.

Thus there has been shown switched reluctance, homopolar, and interior permanent magnet rotors of high strength and low windage loss, employing composite rotor laminations, and a method of fabricating the laminations employed in the rotor. The simplicity of construction of the composite laminations allows them to be fabricated using conventional robotic manufacturing techniques.

While only certain preferred features of the invention have been shown by way of illustration, many modifications and changes will occur to those skilled in the art. It is therefore, to be understood that the appended claims are intended to cover all such modifications and changes as fall within the true spirit of the invention.

What is claimed is:

1. A method for constructing a disk lamination for the rotor of a homopolar or switched reluctance magnetic machine comprising:
   (a) providing a magnetic portion of a disk lamination having an interior core portion of uniform thickness and a plurality of pole pieces extending generally outward therefrom along respective radial lines so as to define an outer circumferential disk edge and form an interpole space, respectively, between each adjacent pair of said pole pieces, respectively;
   (b) inserting the magnetic portion in a jig, the jig comprising a plurality of tables corresponding geometrically in location and configuration to the plurality of interpole spaces;
   (c) positioning the magnetic portion such that the pole pieces are position®d between the plurality of tables;
   (d) guiding a non-magnetic segment, respectively, into each interpole space, respectively, by sliding said segment along the top of the table until angularly opposed edges of the non-magnetic segment abut respective adjacent edges of the pole pieces adjacent thereto; and
   (e) bonding the edges of the pole pieces to the abutting edges of the non-magnetic segments.

2. The method of claim 1 wherein the step of bonding comprises joining the edges of the pole pieces to the abutting edges of the non-magnetic segments by laser beam welding.

3. The method of claim 1 wherein the step of bonding comprises joining the edges of the pole pieces to the abutting edges of the non-magnetic segments by electron-beam welding.

4. The method of claim 1 wherein the step of bonding comprises joining the edges of the pole pieces to the abutting edges of the non-magnetic segments by robotic index welding.

5. The method of claim 1 wherein the thickness of the non-magnetic segments is less than the thickness of the magnetic portion, as measured in the axial direction.

* * * * *